United States Patent
Sun

(10) Patent No.: US 8,345,840 B2
(45) Date of Patent: Jan. 1, 2013

(54) FAST DETECTION AND RELIABLE RECOVERY ON LINK AND SERVER FAILURES IN A DUAL LINK TELEPHONY SERVER ARCHITECTURE

(75) Inventor: Jianli Sun, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 128 days.

(21) Appl. No.: 12/927,815

(22) Filed: Nov. 23, 2010

(65) Prior Publication Data

US 2012/0128135 A1    May 24, 2012

(51) Int. Cl.
 *H04M 15/00* (2006.01)
 *H04M 1/24* (2006.01)
 *H04M 3/08* (2006.01)
 *H04M 3/22* (2006.01)

(52) U.S. Cl. ............ 379/112.02; 379/9.05; 379/15.01; 379/22; 379/22.03; 370/216; 370/217; 370/220; 370/242

(58) Field of Classification Search ............... 379/1.01, 379/9.05, 14, 10.01, 15.01, 15.05, 22, 22.03, 379/27.01, 32.01, 32.02, 32.04, 112.01, 112.02, 379/133, 134, 137; 370/216, 217, 219, 220, 370/223, 241, 242, 244, 248, 250, 251
See application file for complete search history.

(56) References Cited

U.S. PATENT DOCUMENTS

| | | | |
|---|---|---|---|
| 5,896,441 A * | 4/1999 | Akazawa et al. | 379/9 |
| 5,933,474 A * | 8/1999 | Kipp | 379/9.05 |
| 7,778,191 B2 | 8/2010 | Sun | |
| 2003/0123635 A1 | 7/2003 | Lee | |
| 2003/0167343 A1 | 9/2003 | Furuno | |
| 2006/0271665 A1 | 11/2006 | Abe | |
| 2006/0271812 A1 | 11/2006 | Horton et al. | |
| 2007/0058529 A1 * | 3/2007 | Valdes et al. | 370/225 |
| 2007/0268820 A1 * | 11/2007 | McGee et al. | 370/217 |
| 2009/0083455 A1 | 3/2009 | Sun et al. | |
| 2009/0138753 A1 | 5/2009 | Tameshige et al. | |
| 2010/0198718 A1 | 8/2010 | Morosan et al. | |

FOREIGN PATENT DOCUMENTS

| | | |
|---|---|---|
| EP | 2197169 A1 | 6/2010 |
| GB | 2463342 A | 3/2010 |

OTHER PUBLICATIONS

Singh et al.: "Failover, load sharing and server architecture in SIP telephony" Computer Communications, Elsevier Science Publishers vol. 30, No. 5 Feb. 20, 2007; pp. 927-942 Amsterdam.

Zhang, Yunfei bcp for a large scale carrier-level VoIP system using p2psip; IETF; (ISOC) No. 3; Oct. 26, 2010; pp. 1-20; Geneva, Switzerland.

* cited by examiner

*Primary Examiner* — Binh Tieu

(57) ABSTRACT

Methods for detecting and recovering from client-link, server-link, and server-node failures are disclosed. One method comprises providing a dual link architecture. A Link-Status-Notice (LSN) message detailing at least one phone client associated with the client-link failure is sent from a primary telephony server to a secondary telephony server via a server-link. A type of redirect command is sent from the secondary telephony server to the at least one phone client associated with the client-link failure via a secondary client-link. The type of redirect command is based on a content of the LSN message.

20 Claims, 10 Drawing Sheets

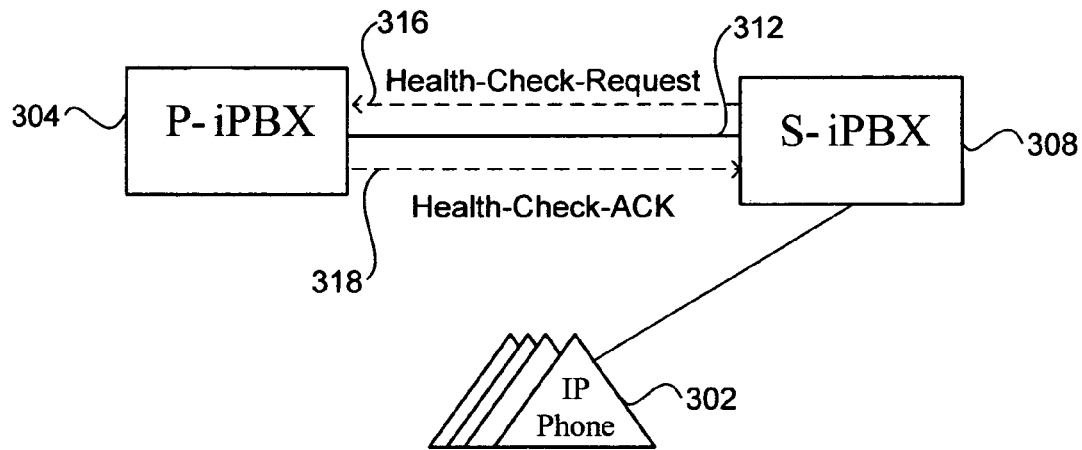
FIG. 3
(Prior Art)
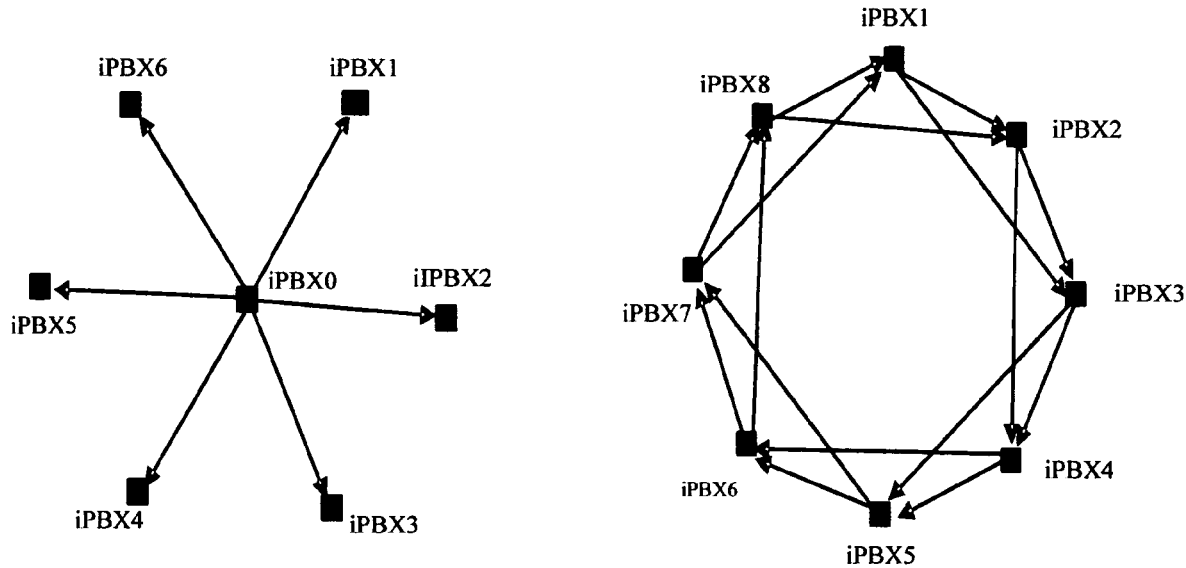
FIG. 4a
(Prior Art)
FIG. 4b
(Prior Art)

FAST DETECTION AND RELIABLE RECOVERY ON LINK AND SERVER FAILURES IN A DUAL LINK TELEPHONY SERVER ARCHITECTURE

BACKGROUND

Private Branch Exchange (PBX) systems have traditionally connected private enterprise telephony systems to the Public Switched Telephone Network (PSTN) using circuit-switched communications. The PBX systems have evolved to include internet PBX (iPBX) systems that use internet protocol (IP) to carry calls over packet-switched Internet connections. Voice Over Internet Protocol (VOIP) telephony using iPBX systems has become increasingly popular.

The traditional PSTN network provides a very stable network that is typically available at least 99.999% of the time (i.e. less than 5.5 minutes of downtime per year). Although VoIP telephony delivers higher productivity to enterprises over a less reliable IP infra-structure, very few industries are willing to compromise the 99.999% availability offered by the PSTN.

Thus, a fundamental focus in designing iPBX systems is to make them less likely to fail. However, due to the added complexities in PBX and iPBX systems, there is no absolute guarantee that a system would never fail due to internal or external troubles. Therefore, a critical consideration is to consider how to resume service very quickly if it is interrupted. Since diagnosis and reconfiguration can take a considerable amount of time, the fastest response is to move the service to backup iPBX servers.

Usually, a single PBX switch can be integrated with component-redundancy to improve the reliability or fault-tolerance. A typical implementation is to dualize each PBX into an active section and a standby section allowing operations to swap to the standby section when a fault has occurred.

Similarly, redundancy can be introduced at the equipment level. Two co-located PBX switches that are tightly coupled through direct links (e.g., fiber interfaces) can be used to provide real-time standby. The tightly coupled co-located switches typically cannot be used for additional purposes other than as a primary system and a backup system. The use of multiple PBX switches significantly increases the cost of a VOIP telephony system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 illustrates a block diagram of a primary server connected to a secondary server;

FIG. 4a illustrates a resiliency relation graph in a star formation;

FIG. 4b illustrates a resiliency relation graph in a ring formation;

Figure 1:
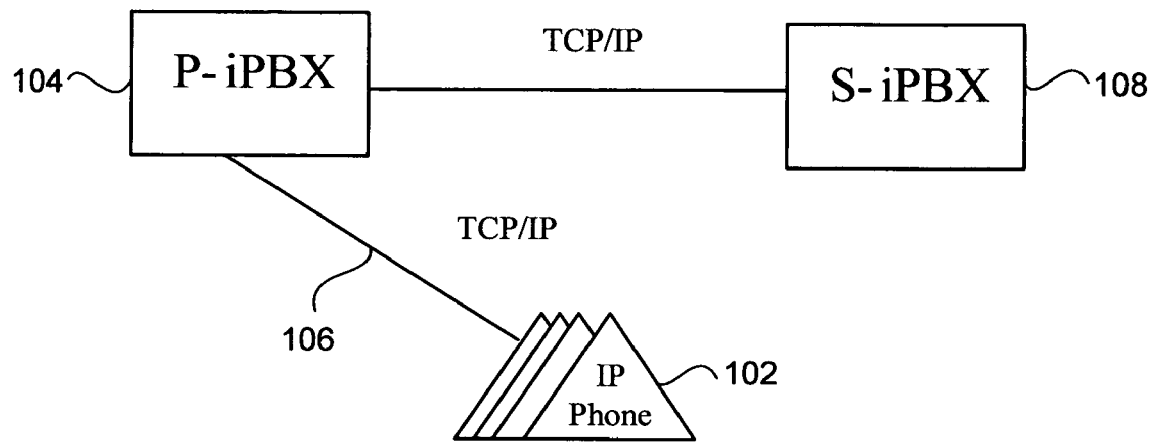
FIG. 1 illustrates a block diagram of a plurality of IP phones connected with a primary iPBX server.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Co-located PBX switches that are tightly coupled through a direct link, such as a fiber channel, can be used a means to provide redundancy to increase the availability of a voice over internet protocol (VOIP) telephony system. However, the cost of the tightly coupled, co-located PBX switches can significantly increase the cost of the VOIP telephony system.

One mechanism of reducing the cost of the system is by using loosely coupled iPBX switches, such as servers that may be located at different sites and interconnected through connection-oriented protocols, such as Transmission Control Protocol (TCP) connections for inter-iPBX communications. The iPBX switches can be referred to as telephony servers. Internet Protocol (IP) phones can be connected to the telephony servers through a TCP connection as well. This allows every IP phone in the VOIP telephony system to be assigned with two iPBX telephony servers, each of which can act as a primary or secondary iPBX switch.

The use of loosely coupled iPBX switches enables the telephony servers to be located at separate locations in a building, or even different buildings, cities, or countries. Since the telephony servers can be located at separate locations, they can be employed for additional purposes aside from acting as a backup or secondary switch in case of problems with the primary iPBX server, or connections with the server. For instance, each iPBX server may be used as a primary server for a selected number of IP phones and as a secondary server to backup a primary server for a selected number of IP phones. Enabling the primary and secondary telephony server(s) to be used for additional purposes can significantly reduce the overall cost of the telephony system since hardware costs do not have to be duplicated to provide for backup servers.

Each of the telephony servers can play a role in providing telephony service to an IP phone. The act of providing backup service to the IP phone is commonly referred to as "resiliency." The loosely coupled iPBX switch model can include two main processes. The first is called the "failover process," wherein IP phones are transitioned from a primary iPBX server to a secondary iPBX server. The second process is referred to as a "failback process," wherein the IP phones at transitioned from the secondary iPBX server to the primary server iPBX server.

FIG. 1 provides an example illustration of a plurality of IP phones 102 connected with a primary iPBX server 104 under typical operating conditions. Each phone can be connected to the iPBX server via a TCP/IP connection 106. Each IP phone is typically connected with a single iPBX server at a time. Initially, an IP phone 102 is registered with its primary-iPBX server (P-iPBX) 104. After registration, the IP phone can receive information on a secondary-iPBX (S-iPBX) 108 to which it will be assigned. This information is typically pre-configured into databases on both of the P-iPBX and S-iPBX.

IP phones and the P-iPBX server are typically configured to verify the availability of the P-iPBX server and the connection between the IP phone and the server. This is often accomplished by exchanging heartbeat messages at a predetermined rate, such as once every 30 seconds. The rate is typically relatively slow so that the IP phone network won't become bogged down when there are hundreds or thousands of phones connected to the P-iPBX server. For instance, if a phone suffers two consecutive heartbeat message misses from the P-iPBX then the phone may be configured to determine that the P-iPBX server is not available.

Figure 2:
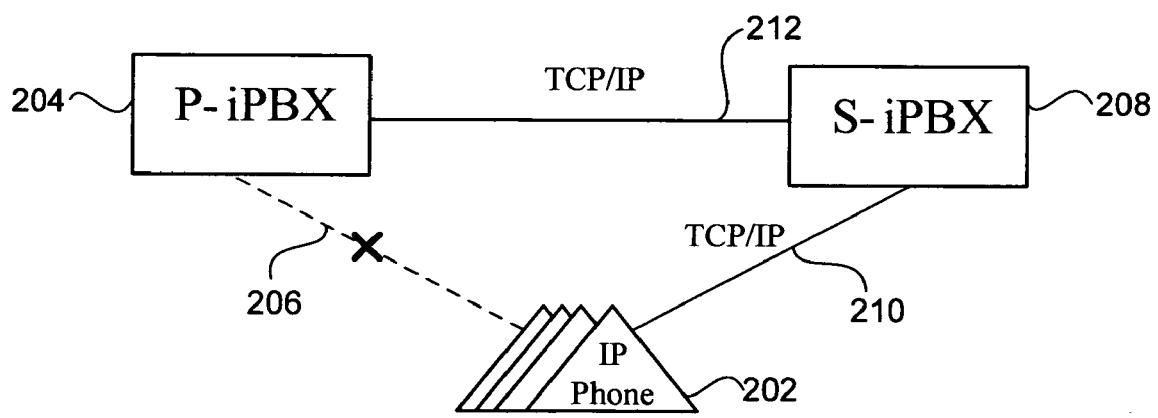
FIG. 2 illustrates a block diagram of a plurality of IP phones connected with a secondary iPBX server.

FIG. 2 shows an illustration in which the phone 202 determines that the iPBX server is not available and proceeds to launch into the failover process by tearing down the current TCP link 206 with the P-iPBX 204 and setting up a new TCP link 210 with the phone's S-iPBX 208, as shown in FIG. 2. The IP phone then registers with the S-iPBX and resumes telephony services.

As the backup, the S-iPBX 208 can check the identity of the registered phones 202. If the S-iPBX finds any phone that has a primary home which is not the local iPBX 204, the S-iPBX can check whether the P-iPBX is available or not. The availability of the P-iPBX can be checked by performing a health-check on the P-iPBX over the connection between the two servers. In one embodiment, the P-iPBX 204 and the S-iPBX 208 can be connected via a TCP/IP connection 212.

As shown in FIG. 3, the health check protocol can include sending a health-check-request message 316 at a periodic frequency from the S-iPBX 308 to the P-iPBX 304. The P-iPBX can respond and send a health-check-acknowledgement 318 over the TCP/IP connection 312. In one embodiment, both the request message 316 and the acknowledgement 318 can contain null data and are logically equivalent to heartbeat messages that are exchanged between the phones 302 and the iPBX 304 when the iPBX is properly functioning. Alternatively, the health check acknowledgement 318 can include data related to the P-iPBX's status (i.e. health) that can be relayed to the S-iPBX. However, since there is typically not a large number of phones that are also connected to the TCP/IP connection 312, the health-check-request messages can be sent at a higher frequency. For instance, the health check messages may be sent every $T\_hc=1$ to 2 seconds. This enables a fast detection of the P-iPBX's availability without creating excessive network overhead.

After the problems with the P-iPBX 304 have been overcome and cleared, the S-iPBX 308 can begin to receive health-check responses. If a number of consecutive health-check-ACK messages are received, such as 3 messages, the S-iPBX can be configured to initiate failback processes to send the IP phones 302 back to their primary iPBX.

Under the failback process, the S-iPBX 308 can issue a redirect command to each corresponding phone. The redirect command can contain the phone's P-iPBX and S-iPBX IP addresses. Each IP phone 302 can tear down its current TCP link to the S-iPBX 308 and register to the P-iPBX 304.

More iPBX switches may be connected into various hierarchal clusters to support more phones and a wider area of service. Although each phone has only one secondary iPBX, thousands of phones may not necessarily share the same primary or secondary switches.

FIGS. 4a and 4b illustrate two types of resiliency relation graphs, where a node represents an iPBX server and a directed edge indicates a primary-secondary resiliency relation between the two nodes, with the arrow pointed to the secondary iPBX.

FIG. 4a illustrates a star-configuration, where iPBX0 in the center acts as a primary telephony server for all phones in a region, and six iPBX servers in different local regions are used as secondary telephony servers for the local phones, with each local phone connected to a single secondary telephony server.

FIG. 4b depicts a ring-configuration, where each iPBX server can function as both a primary server and a secondary server. It should be noted that in the ring configuration, each primary telephony server has a resiliency relation with two secondary telephony servers. That is, each iPBX serves as a primary telephony server for two groups of IP phones and as a secondary telephony server for another two groups of IP phones. The simplicity of this resiliency model makes it relatively easy to design and configure. The telephony services are also reliable under a single server failure situation, in which case each phone can failover to its assigned secondary telephony server.

However, there are several problems with the resiliency models that have been discussed. When an iPBX server becomes unreachable, due to problems with either the server or the link to the server, an IP phone connected to the server can take from T_hb to 2T_hb to detect the problem, where T_hb is the time between heartbeats. For instance, when T_hb=30 seconds, it can take up to one minute to miss two heartbeats at an IP phone and thereby determine that there is a problem.

For a single IP phone, the failover time from the P-iPBX to the S-iPBX includes the TCP connection setup time, the security transportation session (e.g. secure socket layer; transport layer security) setup time, and phone registration setup time with the S-iPBX. These setup processes can require time consuming protocol handshakes with hundreds of message exchanges for each phone.

For a large system with thousands of phones, failover processes may create excessive network traffic and system load. The S-iPBX server signaling path can become congested. Many phones may require multiple attempts to establish the connections. This can often take several minutes to fully complete the process.

Thus, the use of loosely coupled iPBX switches may not handle network link failures well. For instance, in FIG. 2, where the TCP link 206 between the P-iPBX server 204 and the IP phone 202 is down, but the link 212 between the P-iPBX and the S-iPBX 208 is functioning normally, the IP phone may decide to failover to the S-iPBX. However, the S-iPBX may still receive health check acknowledgement messages from the P-iPBX. As a result, the S-iPBX will force the phone to failback to the P-iPBX, which may still be unreachable due to a link problem between the phone and the P-iPBX. This can cause the phone to fall into an endless loop of failover and failback as long as the link 206 is down.

Overall, these problems contribute to a relatively high latency in service failover to the backup server under a network or system failure. This can significantly affect the system availability and reliability.

Dual Link Architecture

Figure 5:
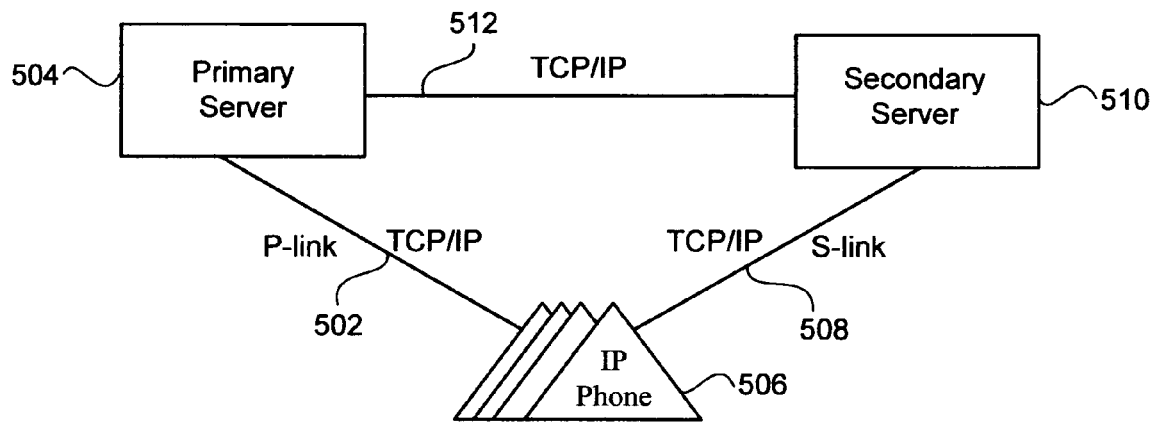
FIG. 5 illustrates a dual link architecture in accordance with an embodiment of the present invention.

In accordance with one embodiment of the present invention, a dual link architecture, as illustrated in the example provided in FIG. 5, can be used to support a more comprehensive fault resilient model. The dual link architecture provides a primary link 502 between a primary telephony server 504 and a plurality of phone clients 506. A secondary link 508 is formed between a secondary telephony server 510 and the plurality of IP phones 506. A server-link 512 is also formed between the primary 504 and secondary 510 telephony servers. The primary link, secondary link and server-link can each be formed using a network transport session such as the internet protocol (IP) transport session using Transmission Control Protocol (TCP). Each IP phone can be quickly connected with the secondary telephony server in the event of a fault. This will be discussed more fully below.

While TCP/IP is typically used, other types of protocols may also be used, such as Real-time Transport Protocol (RTP) running over the User Datagram Protocol or another type of transport protocol that enables the primary server and the secondary server to be located at separate locations, such as separate rooms, separate buildings, separate cities, or even separate continents. The phone clients can communicate with the server using a desired communication protocol, such as IP or RTP. While an "IP phone" is used in the examples included herein, it is not intended to be limiting.

A fault, as used herein, is defined as a system fault that can include a failure of an iPBX node (i.e. telephony server) or a failure of a link between an IP phone and the iPBX node. A link failure can also include a failure of a link between a primary telephony server and a secondary telephony server.

Two recent advances serve as a foundation for the dual link architecture. Traditionally, an IP phone has one circuit connected to a PBX system. In a VoIP architecture, this circuit can be realized by a virtual circuit, such as a TCP connection over the Internet. In a dual link architecture the total number of I/O channels (or TCP sockets) is doubled on each iPBX switch. Since the I/O multiplexing cost is directly proportional to the total number of channels, the dual link architecture would typically double the multiplexing overhead. That is, $T=O(N)$, where T is the CUP time on retrieving data from any active channels having a message waiting from a total N channels.

To overcome this challenge, a method was developed to achieve TCP/IP socket multiplexing in a relatively small time, where the time is independent of the total number of channels N. In other words, no matter how many links or sockets are added on the iPBX, the multiplexing overhead time T is a constant. This enables the dual link architecture to be formed without doubling the multiplexing overhead time. The method of TCP/IP socket multiplexing that is independent of the number of channels is more fully discussed in U.S. Patent Publication No. 2009/0083455, which is incorporated by reference herein in its entirety.

Another advance is the ability of the telephony server, such as an iPBX, to detect a failure rather than relying only on the IP phone to detect a failure. As previously discussed, for an IP phone connected to a telephony server over a TCP/IP connection the failure detection time has traditionally been as long as one minute before the IP phone realizes that two consecutive heartbeat messages from the server have not been received. Since the IP phones have been relied on to detect a failure, the time required for detecting path failures through heartbeats has been the same no matter if the failure is on the server side or the client side. This contributes a significant portion to the service outage time for each phone under a single system failure. Clearly, the failure detection time can be too long for some types of critical applications.

To reduce the failure detection time, it was discovered that failure detection on the TCP/IP link can be accomplished more effectively on the telephony server side. Since a telephony server, such as an iPBX, can have hundreds or thousands of such links, a network outage event would most likely affect more than one link. Therefore, by arranging or classifying the links into proper groups, probing the heartbeats in a certain order, and analyzing the hits of initial failure indications intelligently, iPBX can detect a link failure in about 6 seconds, which is a significant improvement over the 31-60 second failure detection time by the IP phone. The system and method for failure detection on the telephony server side is more fully discussed in U.S. Pat. No. 7,778,191, which is incorporated by reference herein in its entirety.

The significantly improved link failure detection time can be improved upon even further using the dual link architecture. Once one or more link failures have been detected, the IP phones need to be redirected to the backup telephony server. As previously discussed, the failover process in a TCP/IP connected telephony server can take several minutes due to network traffic congestion in the failover process. The dual link architecture can significantly reduce the time it takes for a single phone, or thousands of phones, to failover to a backup server. Several other additional benefits are also derived from the dual link architecture as well. This will be discussed more fully below.

Reducing Failover/Failback Latency Through Pre-Registration

When an IP phone is initially powered on or rebooted, the phone goes to the first phase of Dynamic Host Configuration Protocol (DHCP) initial startup. An IP phone can obtain its Internet Protocol (IP) address and a list of telephony servers from a DHCP server that is pre-configured on a Local Area Network (LAN) connected to the IP phones. The list of telephony servers can contain each IP phone's primary telephony server and secondary telephony server. The telephony server may be an iPBX server or another type of telephony server.

The IP phone can then proceed to a second phase of establishing a TCP connection between the IP phone and the primary telephony server. If a secured link is to be established, additional security negotiations can be performed as well, as can be appreciated.

In the third phase, the phone can perform registration protocols. The registration protocols may be device dependent. For instance, a phone manufactured by Mitel can be configured to perform the Mitel Device Registration Protocol to enable the IP phone applications and services to operate. Protocols may be used based on the type of phone connected to the network.

The processes in the first, second, and third phases typically involve exchanging hundreds of messages between the IP phone and the primary telephony server in a single-stage registration protocol. When an IP phone has to switch to a backup server, most of these hundreds of messages still need to be sent. As previously discussed, when hundreds or thousands of phones are connected to a telephony server, the links can become bogged down during the failover process as they each attempt to perform the registration protocol with a secondary telephony server. This further extends the time for an IP phone to recover from a telephony server failure or a link failure.

To reduce the amount of time it takes for an IP phone to failover from a primary telephony server to a secondary telephony server, a hierarchal two-stage device registration protocol can be used. The two-stage device registration protocol partitions the original single-stage protocol into two stages. The first stage is called the pre-registration stage. All configurations and service data are communicated at this stage. Pre-registration is substantially the same as the original single-stage registration protocol. However, in the two-stage device registration protocol the IP phone is put in an out-service state. The second stage is called "in-service stage", which simply puts the phone to an in-service state with a telephony server, such as an iPBX.

Figure 6:
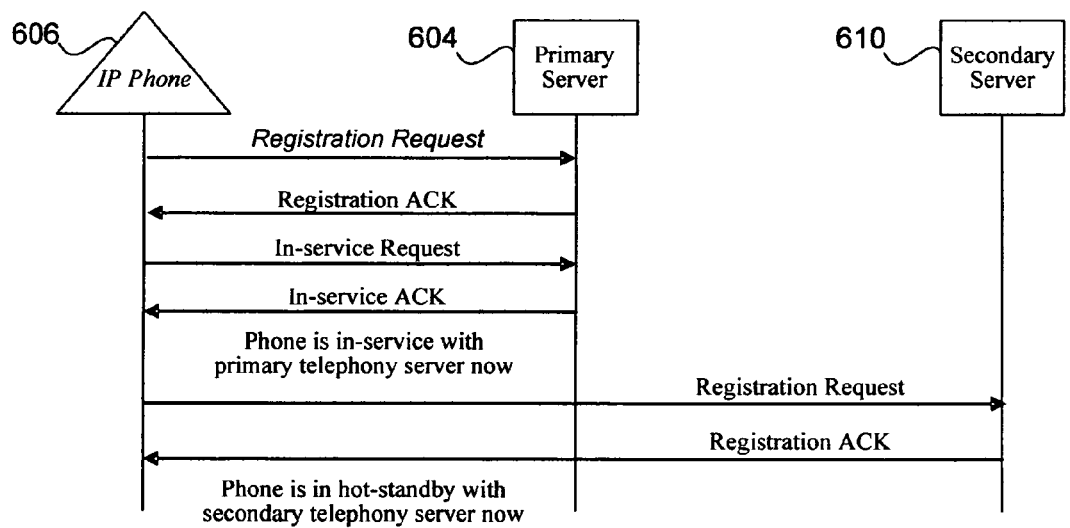
FIG. 6 illustrates a two-stage device registration process in the dual link architecture in accordance with an embodiment of the present invention.

FIG. 6 illustrates the two-stage device registration in a dual link architecture. An IP phone can complete both the first and second stages of registration with a primary telephony server, while completing the first stage with a secondary telephony server. The process involves sending a registration request from the IP phone 606 to the primary telephony server 604. The primary telephony server can respond with a registration acknowledgment once registration has been completed. The registration process can be substantially similar to the three phase process that has been previously described, although any type of registration process that allows the IP phone to use the primary telephony server as its host server can be used.

The IP phone 606 can then be configured to send an in-service request to the server that was designated as the IP phone's primary telephony server. The primary telephony server can then send an in-service acknowledgement, at which time the IP phone is configured to operate using the primary server.

Similarly, the first stage of the device registration can be conducted between the IP phone 606 and the secondary telephony server 610. The IP phone 606 can send a registration request to the secondary telephony server. Once registration has been completed, the secondary telephony server can respond with a registration acknowledgement. This places the IP phone in a hot-standby mode with the secondary telephony server.

After completing the two-stage device registration in the dual link architecture, the IP phone is still only in-service with a single telephony server at one time. However, the capability of the IP phone to switch to a backup (secondary) telephony server is significantly enhanced by the ability of the IP phone to register with both the primary telephony server 604 and the secondary telephony server 610. This also significantly reduces the amount of network traffic that occurs when a failback process occurs, thereby reducing the chance of the network bogging down.

Figure 7:
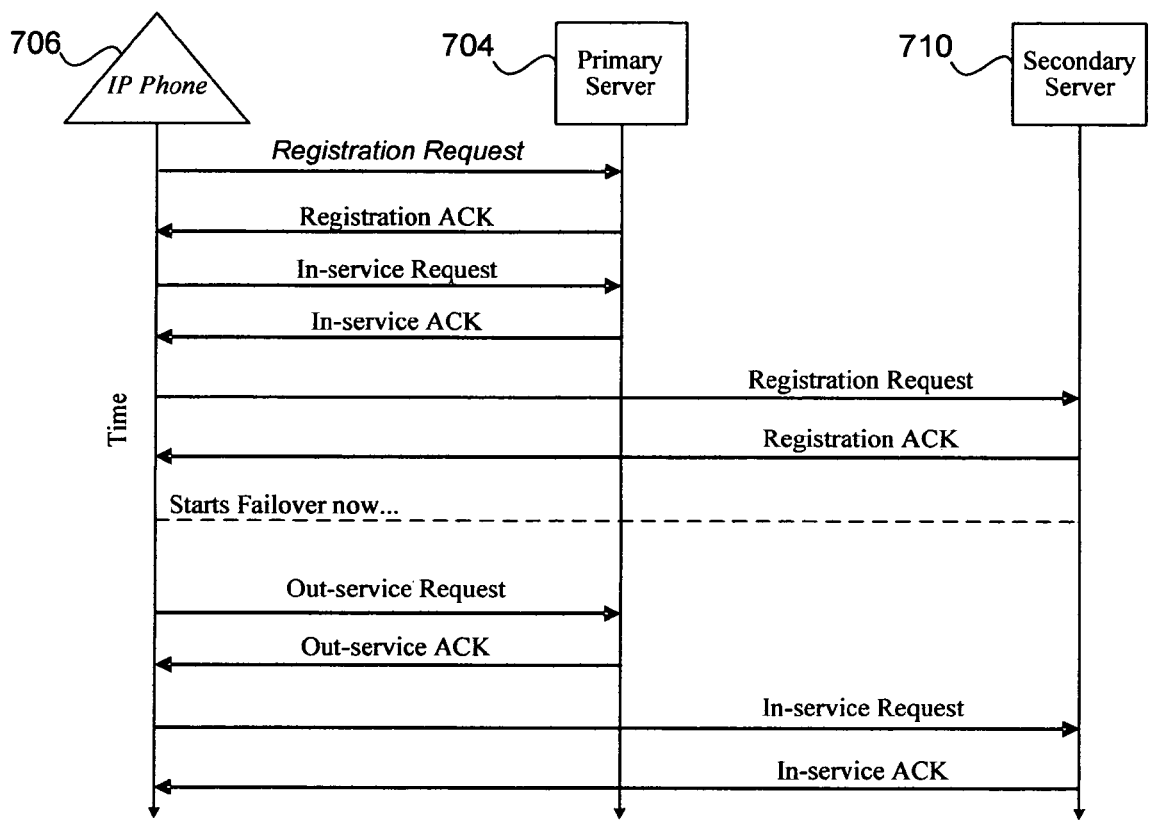
FIG. 7 illustrates a failover process for the dual link architecture in accordance with an embodiment of the present invention.

The failover process for the dual link architecture comprises two steps, as illustrated in FIG. 7. When the primary telephony server 704 is not available to the IP phone 706, or the link between the IP phone and the telephony server is not functioning properly, then the failover process can occur. The failover process for the IP phone 706 in the dual link architecture consists of sending an out-service request to the primary telephony server 704, with a response of an out-service acknowledgement from the primary telephony server to the IP phone. The primary telephony server may or may not be able to receive the out-service request. However, if the primary telephony server is still functioning and can communicate with the IP phone, the out-service request will place the primary telephony server into a hot-standby mode with the IP phone.

The IP phone 706 can then send an in-service request to the secondary telephony server 710 with which it previously registered. An in-service acknowledgement can be sent from the secondary telephony server to the IP phone. When the acknowledgement is received at the IP phone, the IP phone can be fully functional through the secondary telephony server. The amount of information exchanged between the IP phone and the secondary server is just a single message of a few bytes. Substantially less network bandwidth is consumed than is consumed during the entire registration process. For a single phone, the failover process can be accomplished in tens of milliseconds; for one thousand phones, the failover process can be completed in a matter of seconds.

Figure 8:
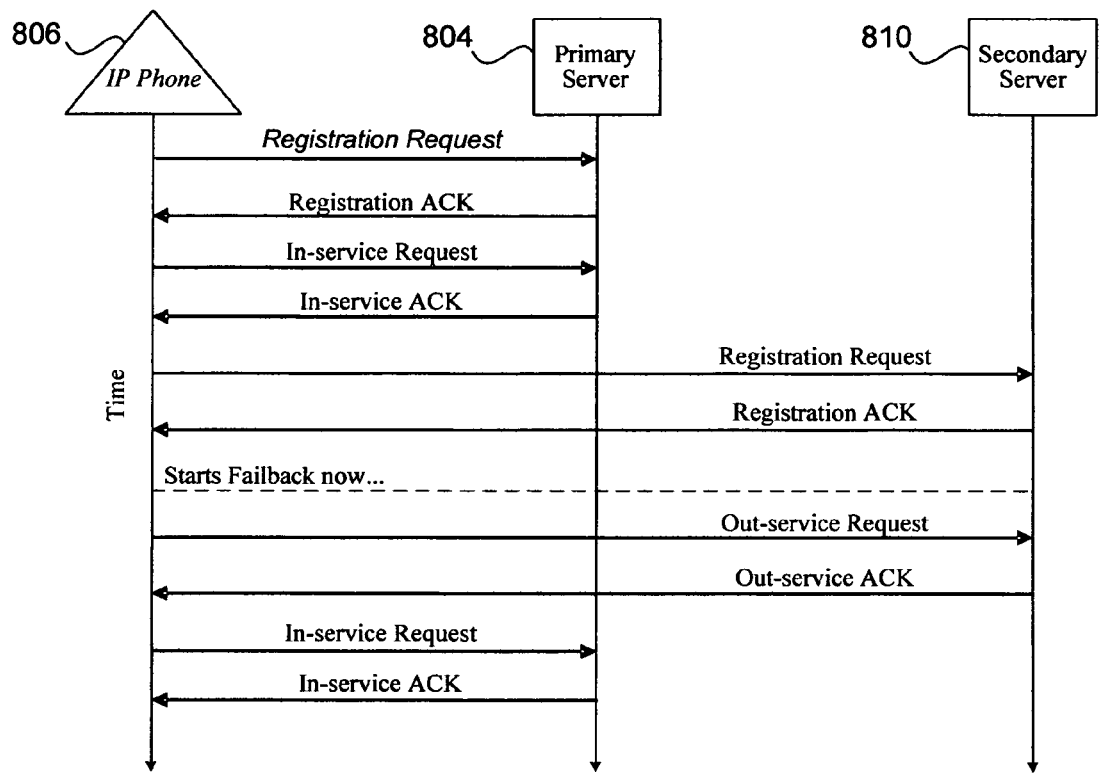
FIG. 8 illustrates a failback process for the dual link architecture in accordance with an embodiment of the present invention.

Once communication with the primary telephony service 804 has been restored then the IP phone 806 can be redirected back to the primary server, as illustrated in FIG. 8. This is referred to as the failback process. The new failback process comprises sending an out-service request message from the IP phone 806 to the secondary telephony server 810 and receiving an out-service acknowledgement back from the secondary telephony server to the IP phone. An in-service request can then be sent from the IP phone to the primary telephony server 804 and receive an in-service acknowledgement from the primary telephony server at the IP phone.

The ability to pre-register each IP phone with both the primary telephony server and the secondary telephony server allows the failover process and the failback process to be conducted in a relatively short period of time while significantly reducing the level of traffic on the TCP connections in the IP telephony network.

Fast Detection of Client-Link Failure

Figure 9:
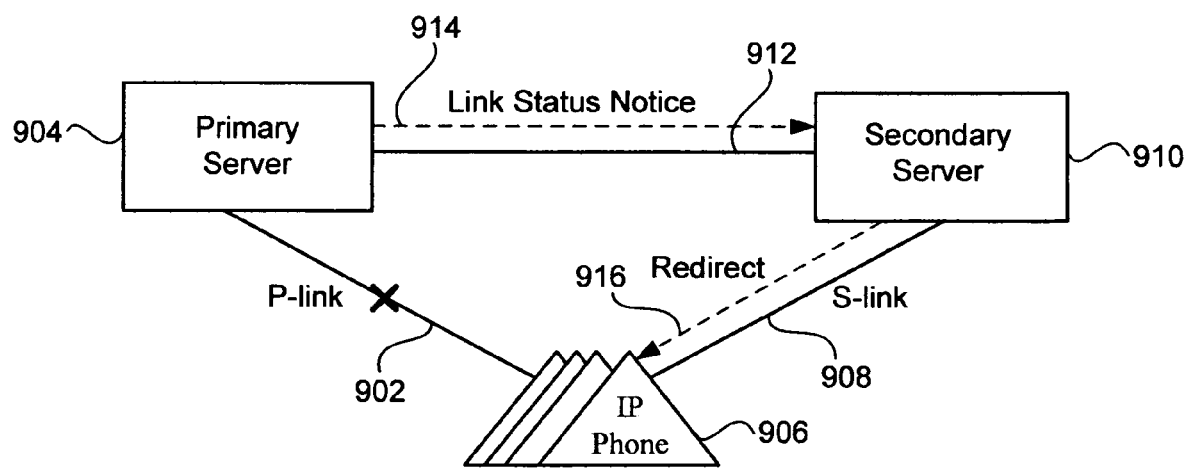
FIG. 9 illustrates the dual link architecture used to send a link status notice in accordance with an embodiment of the present invention.

FIG. 9 provides an illustration of a dual link architecture. The link between an IP phone 906 and a primary telephony server 904 or secondary telephony server 910 can be referred to as a "client link". The link between the primary telephony server 904 and the secondary telephony server 910 can be referred to as the "server-link" 912.

In one embodiment, when a client-link failure occurs, wherein the IP phone 906 cannot communicate with the primary telephony server 904 over the P-link 902, the primary (or secondary) telephony server 904 can detect the failure almost 10 times faster than an IP phone on the telephony network does. This assumes that a heartbeat message is communicated from the IP phone to the telephony server once every 30 seconds and a link failure is declared when two consecutive heartbeat messages are missed.

If the client-link failure can be reported to the client (i.e. the IP phone 906 at which the client-link failure has occurred) then the client can take action more quickly. The dual link architecture enables a report of the client-link failure to be forwarded to the IP phone through an alternate path. As illustrated in FIG. 9, whenever the primary telephony server 904 detects a client-link failure with an IP phone 906, the failure information can be communicated by the primary telephony server to the secondary telephony server 910 over the server-link 912 in a Link-Status-Notice (LSN) message 914.

In one embodiment, the LSN message 914 can include three attributes:

LSN=(S,C,DN-list), where S is a severity indicator with a range of values such as {none, minor, major; critical}, C is the total count of failed client-links, and DN-list is a list of directory numbers (DN) of the client phones having client-link failures. If S=none and C=0 then it indicates that there are no failed links. This enables the secondary telephony server 910 to clear any previously received failure notices. Similarly, if S=critical and C>0 then it is a strong indication that all client-links 902 connected with the primary telephony server 904 may have failed.

Upon receiving an LSN message 914, the secondary telephony server 910 can take actions based on the severity level and number of failures. For instance, if S=minor (or major), the secondary telephony server can send a redirect-optional command 916 to each IP phone 906 that is included in the LSN message 914. This communication can occur over the S-link 908, which was previously setup between the secondary telephony server and each IP phone 906.

The redirect-optional command 916 invites the IP phone 906 that receives the command to failover to the secondary telephony server 910 optionally. The IP phone can be configured to ping its current in-service primary telephony server 904 when the redirect-optional command 916 is received prior to switching over to the secondary telephony server 910 that is on hot-standby. If the ping test fails, the IP phone can be configured to switch over (i.e. failover) to the secondary telephony server without waiting for two consecutive heartbeat misses from the primary telephony server. This enables the IP phone to more quickly make a decision to failover to the secondary telephony server. If the ping test is successful then the IP phone can maintain its in-service connection with the primary telephony server and hot-standby connection with the secondary telephony server. Thus, when a redirect-optional command is received by an IP phone then the failover decision is made by the IP phone.

On the other hand, if an LSN message 914 is received at the secondary telephony server 910 where S=critical then the secondary telephony server can send a redirect-force command to direct all of the IP phones 906 to immediately failover to the secondary telephony server 910. In this case, the IP phone will not ping the primary telephony server 904. Rather, each IP phone that receives a redirect-force command will immediately failover to the secondary telephony server. When a redirect-force command is sent by a secondary telephony server to one or more IP phones then the decision to failover is made by the secondary telephony server to avoid unnecessary verification overhead on the telephony network.

After all IP phones 906 are in-service with the secondary telephony server, the secondary telephony server 910 can clear the previously received LSN messages since the primary telephony server 904 will eventually tear down these links 902.

In one embodiment, the primary telephony server 904 can begin to transmit LSN messages to the secondary telephony server 910 only after the IP phones 906 failback so that they are in-service with the primary telephony server.

The ability of the primary telephony server 904 to identify potential link failures to the secondary telephony server 910 using the LSN message 914 enables the link failures to be detected and dealt with at a much greater speed than is possible if the IP phone itself is the only device configured to detect and deal with a link failure. The dual link architecture allows the primary telephony server to detect a failure and communicate it to the secondary telephony server in a matter of seconds (i.e. 6 seconds). After receiving the LSN report, the secondary telephony server can then provide instructions in a few milliseconds to each IP phone over a separate link 908, enabling the IP phones to failover to the secondary telephony server in an overall significantly shorter time period than is possible in a traditional architecture where an IP phone is only connected to a single telephony server at a time.

Figure 14:
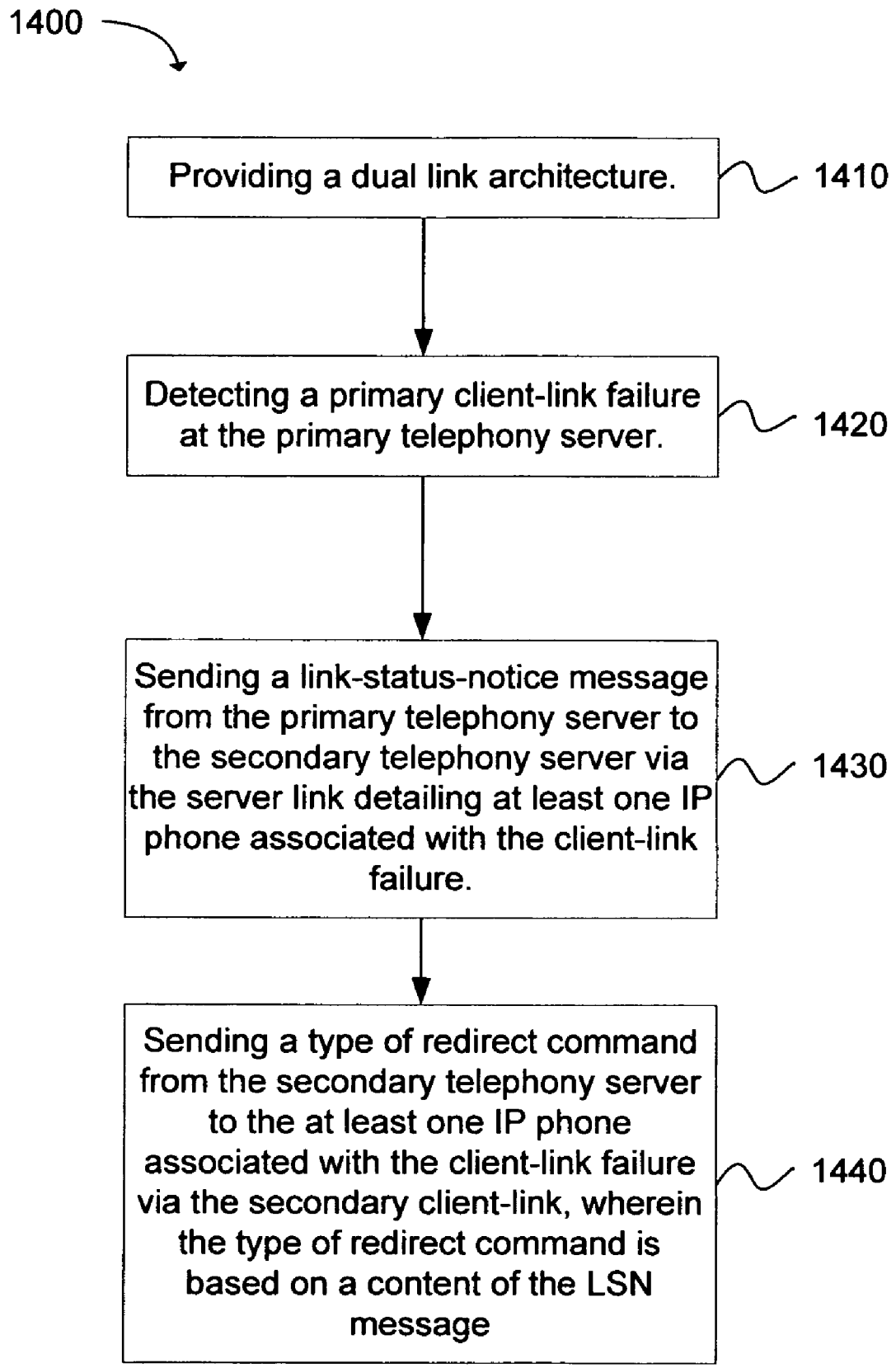
FIG. 14 depicts a flow chart depicting a method for detecting a client-link failure in accordance with an embodiment of the present invention.
Figure 15:
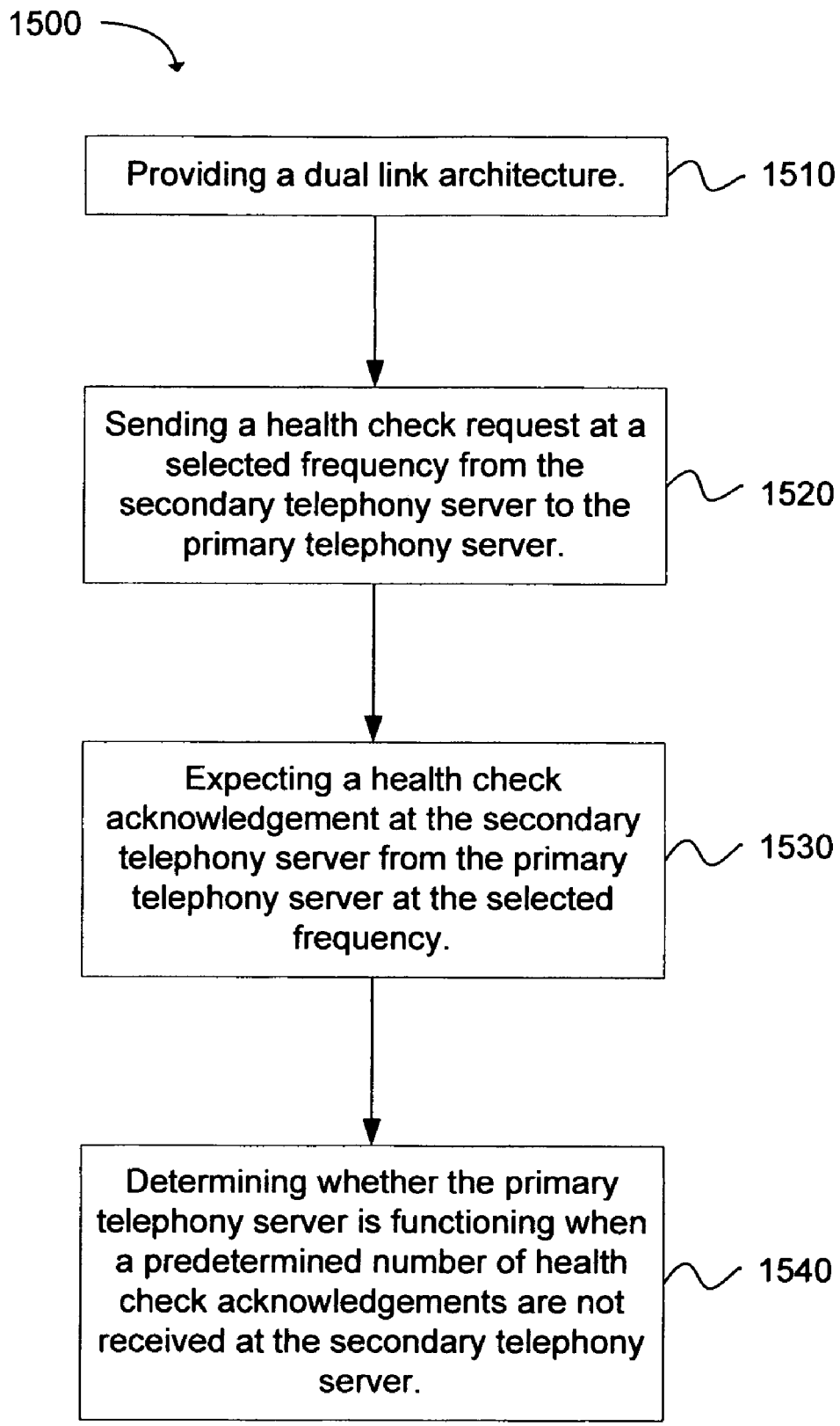
FIG. 15 depicts a flow chart depicting a method for detecting a primary server failure in accordance with an embodiment of the present invention.

In accordance with one embodiment of the present invention, a method 1400 for detecting a client-link failure is disclosed, as depicted in the flow chart of FIG. 14. The method comprises providing 1410 a dual link architecture comprising: a primary telephony server in communication with at least one IP phone through a primary client-link formed using a transmission control protocol; a secondary telephony server in communication with the at least one IP phone through a secondary client-link formed using a transmission control protocol; and a server-link formed using the transmission control protocol between the primary and secondary telephony servers. The primary and secondary telephony servers can be iPBX servers, as previously discussed.

The method 1400 further comprises detecting 1420 a primary client-link failure at the primary telephony server. A link-status-notice message can be sent 1430 from the primary telephony server to the secondary telephony server via the server link detailing at least one IP phone associated with the client-link failure. A selected type of redirect command can be sent 1440 from the secondary telephony server to the at least one IP phone associated with the client-link failure via the secondary client-link. The redirect command can instruct the at least one IP phone to failback to the secondary telephony server. The type of redirect command is based on the contents of the LSN message. For instance, the redirect command may be optional or mandatory, depending on the severity of the failure, as previously discussed.

Fast Detection of Server-Node Failure

Figure 10:
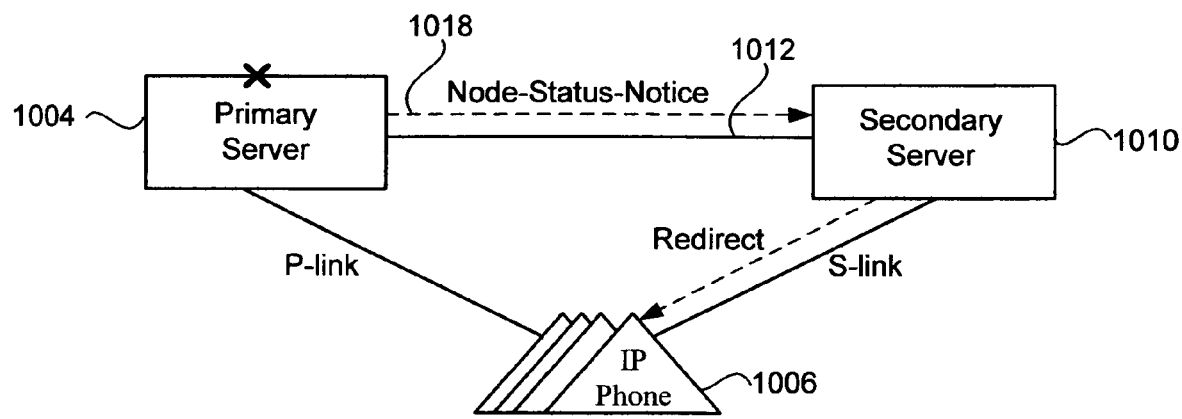
FIG. 10 illustrates the dual link architecture used to send a node status notice in accordance with an embodiment of the present invention.

FIG. 10 illustrates the dual link architecture in which a Node-Status-Notice (NSN) message 1018 can be an autonomous message sent from the primary telephony server 1004 to the secondary telephony server 1010 over the sever link 1012. Similar to the LSN message, the NSN message can indicate the primary telephony server's internal hardware/software conditions.

When a telephony server, such as an iPBX server, is unable to provide normal functional services, it may still be able to receive and send heartbeat messages or respond to reachability tests. The link status may not be sufficient to indicate that the server is operating normally. The NSN can be used to communicate the server's health to enable proactive measures to be taken if and when the normal operation of the primary telephony server begins to cease.

The secondary telephony server 1010 can be configured to send a redirect-force command to the IP phones connected with the primary telephony server 1004 when the server's failure severity is critical. The primary telephony server can then attempt a system reboot to recover from the internal failure. When the secondary telephony server receives an NSN message from the primary telephony server indicating that the primary telephony server is again operating normally then a failback command can be sent to the IP phones inviting the phones to failback to their primary telephony server 1004. The failback command will be discussed more fully below.

Fast Detection of Server-Link and Server-Node Failures

Figure 11:
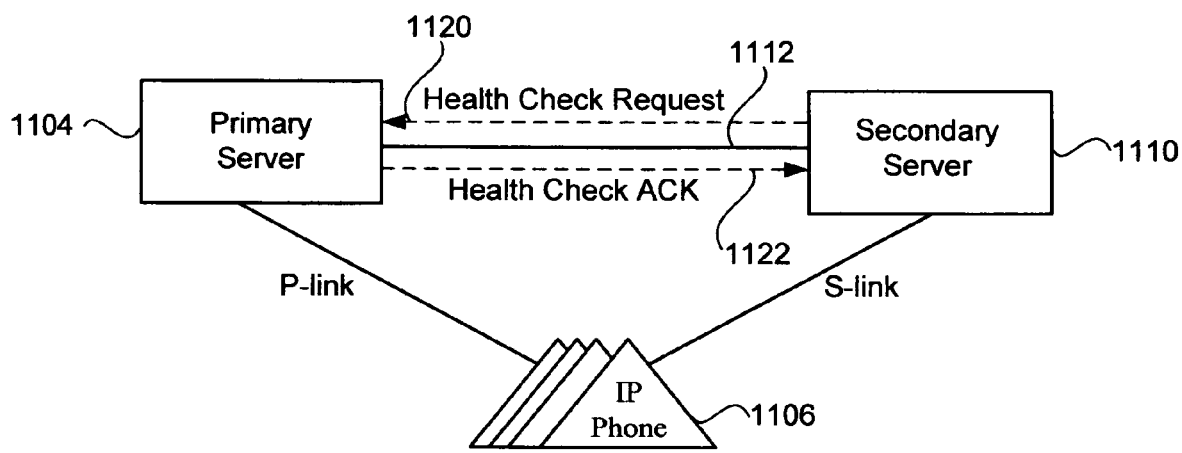
FIG. 11 illustrates the dual link architecture used to send a health check request in accordance with an embodiment of the present invention.

In FIG. 11, all IP phones 1106 are in-service with the primary telephony server 1104. The secondary telephony server 1110 can be configured to send health-check requests 1120 to the primary telephony server at a periodic rate and receive health check acknowledgements 1122 from the primary telephony server at the periodic rate. If the secondary telephony server misses M consecutive acknowledgements from the primary telephony server, where M is a positive integer, then it can be determined at the secondary telephony server that either the server link 1112 has failed or the primary telephony server 1104 has failed. The value of M can be selected based on system design. For instance, in one embodiment, M may be equal to three. M will typically have a value between 2 and 10.

If the failure is caused by the primary telephony server 1104 (i.e. the server has crashed), the secondary telephony server 1110 can proactively initiate the failover process. The initiation of the failover process has traditionally been the role of the IP phone. However, in the dual link architecture the initiation privilege can be shared by IP phone 1106 and the secondary telephony server. Whichever device detects the failure first can initiate the failover process. In this embodiment, the secondary telephony server can send a redirect-force command to each IP phone to force the phone to go in-service with the secondary telephony server immediately.

Figure 12:
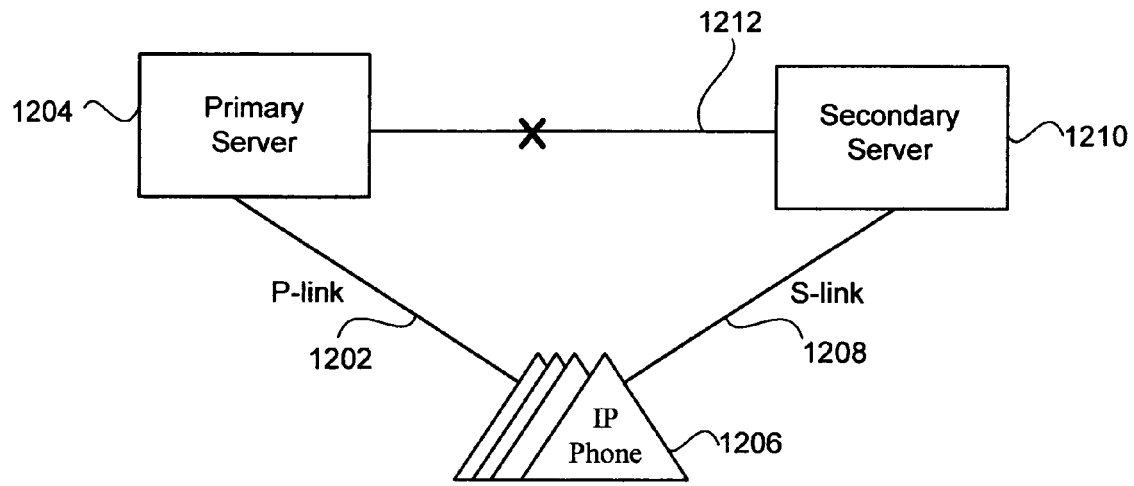
FIG. 12 illustrates the dual link architecture with a server link failure in accordance with an embodiment of the present invention.

On the other hand, if the failure to receive M consecutive health-check acknowledgement messages from the primary telephony server 1204 is caused by a failure of the server-link 1212, as illustrated in FIG. 12, then it may not be necessary to order the IP phones to failover to the secondary telephony server 1210.

Thus, further verification may be needed when the secondary telephony server 1210 fails to receive the M consecutive health-check acknowledgement messages. The further verification can determine whether the failure is due to a server-link failure 1212 or a primary telephony server 1204 failure in order to take the proper resiliency actions. In the following, two innovative algorithms are described that enables the secondary telephony to perform further verification.

Peer Group Consulting

Every IP phone's DN (Directory Number) supported by a telephony server is traditionally configured in the server's memory system, where each DN is also configured with the primary server and secondary server. Thus, the primary telephony server knows all secondary telephony servers for all IP phones that are connected to the primary telephony server. For instance, in FIG. 4a, the primary telephony server (iPBX0) knows that the other six switches are its secondary servers. However, the other six switches are not aware of each other in terms that they share a common primary server. This is due to the fact that each secondary server does not have the configuration information of those DNs supported by other secondary servers.

In FIG. 4b, in a traditional mode, all peers are not coordinating with each other in supporting the resilience for a given set of IP phones in a telephony network.

In the dual link architecture, the secondary telephony servers can be configured to be aware of each other. The secondary telephony servers that are configured as backups to a primary server are referred to as a peer group. In FIG. 4a, there are six switches (except iPBX0) that are in a peer group. Each secondary telephony server in FIG. 4a has five peers. In FIG. 4b however, every iPBX has one, and only one peer. Each peer can have a separate server-link to the primary server.

The knowledge that a peer is able to communicate with its primary telephony server can be useful to other peers in the peer group. When a secondary telephony server fails to receive M consecutive health-check acknowledgement messages, the knowledge of the ability to communicate from the other peers in the peer group can be used to determine whether the failure is a server-link failure or a primary server failure. If one of the peers in the peer group reports that the primary telephony server is still reachable then it implies that the local health-check failure was due to the server-link failure between the secondary telephony server and the primary telephony server. If all of the consulted peers agree that the primary telephony server is unreachable then it is most likely that the primary telephony server is down.

When a secondary telephony server has many peers then a smaller number of peers can be selected from different subnets to convey a variety of network topology information, as can be appreciated.

The process of communicating with peers in a peer group to determine if the primary telephony server is operating is revered to as Peer Group Consulting (PGC). In order to enable PGC, the primary telephony server can advertise a peer-list to all of the secondary telephony servers. This may occur after the IP phones have all been registered with a primary and secondary telephony server.

Figure 13:
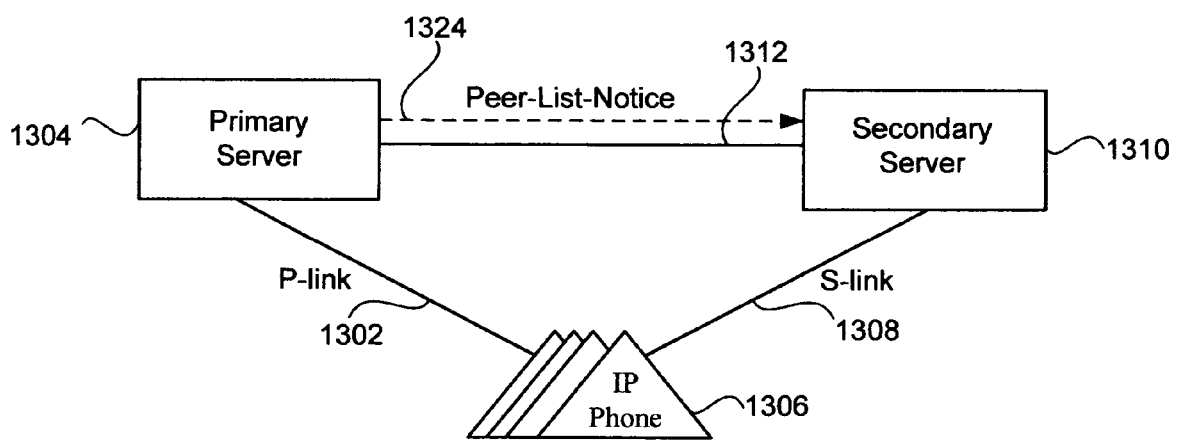
FIG. 13 illustrates the dual link architecture used to send a peer-list notice in accordance with an embodiment of the present invention.

FIG. 13 illustrates the dual link architecture in which a peer-list-notice message 1324 is sent from the primary telephony server 1304 to the secondary telephony server 1310 via the server-link 1312. Whenever the peer list is changed then an updated peer-list-notice message can be sent to maintain the integrity of the peer group. The peer-list-notice message can also be an autonomous message sent from the primary telephony server to the secondary telephony server, similar to the LSN and NSN messages that were previously discussed. The Peer-List-Notice can be sent to the members of the peer group from the primary telephony server if the peer group changes. For instance, the peer group may change due to an added secondary telephony server, a removed secondary telephony server, a secondary telephony server that goes out-of-service, or a secondary telephony server that returns to service.

In accordance with an embodiment of the present invention, a method 1500 for detecting a primary server failure is disclosed. The method includes the operation of providing 1510 a dual link architecture comprising: a primary telephony server in communication with at least one IP phone through a primary client-link formed using a transmission control protocol; a secondary telephony server in communication with the at least one IP phone through a secondary client-link formed using a transmission control protocol; and a server-link formed using the transmission control protocol between the primary and secondary telephony servers. The primary and secondary telephony servers can be iPBX servers, as previously discussed.

The method 1500 further comprises sending 1520 a health check request at a selected frequency from the secondary telephony server to the primary telephony server. A health check acknowledgement from the primary telephony server is expected 1530 at the secondary telephony server at the selected frequency. A determination 1540 can be made as to whether the primary telephony server is functioning when a predetermined number of the health check acknowledgements are not received at the secondary telephony server.

In one embodiment, the method 1500 further comprises sending a peer-link request to each peer secondary telephony server connected with the primary telephony server. A response is then received from each peer secondary telephony server regarding whether each peer secondary telephony server can communicate with the primary server. A redirect-force command is sent to the at least one IP phone when each peer secondary telephony server reports no communication with the primary server.

Heuristic Hand-Over

PGC, discussed above, is a deterministic method to verify health-check failures in order to determine whether it is primary-server failure or the server-link failure. Alternatively, Heuristic Hand-Over (HHO) is a simpler but heuristic method for the same objective. As previously discussed, each IP phone 1306 in the dual link architecture can ping the primary telephony server 1304 over the P-link 1302 to test the phone's ability to communicate with the primary telephony server. If the secondary telephony server 1310 sends a redirect-optional command to an IP phone 1306 over the S-link 1308, it can be inferred that the primary telephony server may not be available. The IP phone can be configured to test the primary telephony servers reachability before performing the failover process to the secondary telephony server.

In accordance with one embodiment of the present invention, when a secondary telephony server 1310 fails to receive M health-check-acknowledgement messages, such as 3 messages, the secondary telephony server can be configured to proactively invite a small number of K IP phones 1306 to failover to the secondary telephony server by sending the IP phones a redirect-optional command. The value of K can be selected based on the design and operation of the telephony network. In this example the value K=10 is used. However, the value may be between 2 and 100 or more phones.

After the redirect-optional command has been sent by the secondary telephony server 1310 to the 10 phones, the secondary telephony server can watch for a selected time period, such as 2-4 seconds, to see if the K IP phones 1306 send an in-service request. Each of the IP phones can ping their primary server 1304 to determine if it is still reachable. As a consequence, if no in-service requests are received, then it can be inferred that all of the IP phones can still reach their primary server. Thus, it can be assumed that the failure to receive the health-check-acknowledgment messages was caused by a server-link failure between the primary telephony server and the secondary telephony server.

Although the chance is small, it is possible that the first group of K IP phones 1306 might be in voice-streaming or busy states, in which case no phone may make any failover action until it is idle. Therefore, before making a final decision, the secondary telephony server 1310 can retry a few times by inviting more (2K, 4K, etc.) IP phones to failover.

If all tests show consistent results, then it can be concluded that the failure to receive the health-check-acknowledgment messages was due to the server-link 1312 failure. The secondary telephony server 1310 can then issue warnings to the system administrator without forcing the phones to failover.

If a substantial number of the K IP phones 1306 failover to the secondary telephony server 1310 then it can be concluded that the failure to receive the health-check-acknowledgment messages at the secondary telephony server was due to a failure of the primary telephony server 1304. The secondary telephony server can then make a final decision and send redirect-force commands to the rest of the IP phones connected with the primary telephony server.

The process of asking a selected number of IP phones 1306 to failover, when a number of health-check-acknowledgment messages have not been received at the secondary telephony server 1310, is referred to as Heuristic Hand-Over (HHO). Both PGC and HHO algorithms can be used to enhance the efficacy of the health check request between the secondary and primary 1304 telephony servers. PGC can be faster in verifying results. However, HHO may be simpler in implementation. In particular, if a secondary telephony server has no peers then HHO can be a good choice.

In accordance with an embodiment of the present invention, the method 1500 includes the operation of sending a redirect-optional command from the secondary telephony server to a selected number of the at least one IP phones. A ping is sent from each of the selected IP phones to the primary telephony server. A failover is performed for the selected IP phones if the primary telephony server does not respond to the ping. A determination is made that the primary telephony server is not functioning if the failover is performed for the selected IP phones within a selected time period. Therefore, a redirect-force command is sent to a remaining number of the at least one IP phones.

In accordance with another embodiment of the present invention, the method 1500 includes the operation of sending a redirect-optional command from the secondary telephony server to a selected number of the at least one IP phone. A ping is sent from each of the selected IP phones to the primary telephony server. A failover is performed for the selected IP phones if the primary telephony server does not respond to the ping. A determination is made that the primary telephony server is functioning if the failover is not performed for the selected IP phones within a selected time period. Therefore, a request to repair the server-link between the primary and secondary telephony servers is made when at least one of the selected IP phones does not failover.

Reliable Failure Recovery with Heuristic Hand-Back

In accordance with one embodiment of the present invention, the secondary telephony server 1310 can be configured to determine when the IP phones 1306 can be sent back to the primary server 1304 through the failback process. The secondary telephony server can continuously perform health-checks on the primary telephony server.

If the failover of the IP phones was caused by a failure to receive M health-check acknowledgment messages due to a failure of the primary telephony server (i.e. the server crashed), then it can be assumed that at some point the primary telephony server will recover. At that point, the secondary telephony server will again receive health-check-acknowledgement messages at the predetermined periodic rate. At this point, all of the IP phones that are in-service with the secondary telephony server can be ordered to start pre-registration with the primary telephony server, followed by an out-service request to the secondary telephony server and an in-service request with the primary telephony server.

If the failover of the IP phones 1306 was caused by a P-link failure 1302 then the health-check requests on the server link 1312 will be successful during the failover process and the secondary telephony server 1310 may not be able to determine when to order the pre-registration process to start.

The speed of the failback process is typically not urgent since the IP phones can operate normally on the secondary telephony server. Thus, in either case, the pre-registration process with the primary telephony server can begin with a small number of IP phones to avoid overwhelming the telephony network.

To determine whether or not the P-link 1302 failure is still outstanding, another innovative method called Heuristic-Hand-Back (HHB) can be used by the secondary server. Once a health-check-acknowledgement message from the primary telephony server is received at the secondary telephony server, the secondary telephony server can begin to send register commands to a selected number of K IP phones that are in-service with the secondary telephony server. In one embodiment, the selected IP phones can be selected randomly. Alternatively, a sequential number of phones may be selected. The value of K may be a number such as 10. However, any number between 2 and several hundred IP phones may be selected to receive the register command.

After receiving the register command, each of the K phones can then try to establish a TCP connection with the primary telephony server, set up security transport sessions if needed, and register with the primary telephony server. After these steps have been successfully completed, each IP phone can send the secondary telephony server a register-OK message.

If one or more of the steps is not successfully completed then a register-fail reply message can be sent to the secondary telephony server. When a register-fail reply message is received at the secondary telephony server then it can be configured to exit the ongoing pre-registration process for a selected time period, such as T_fb=10 minutes, where T_fb is the failback time period that the secondary telephony server is instructed to wait before restarting the registration process.

If the secondary telephony server receives a register-OK message from each of the selected K IP phones then the register command can be sent to additional selected IP phones that are in-service with the secondary telephony server. For instance, the register command may be sent to 2K, 4K, 8K phones, or another number of phones. As the register-OK reply messages are received then the process is continued until all of the phones that are in-service with the secondary telephony server are pre-registered with their respective primary telephony server.

After the T_fb time has expired then the HHB process starts over again using the above process until all of the phones are pre-registered with the primary telephony server.

Eventually, when the primary telephony server has been restored to full health, all IP phones will eventually be ready for failback. The failback process can be accomplished in a graceful manner using multiple transactions. Before doing every failback transaction, the secondary telephony server can be configured to check the following conditions: the client-link status between each IP phone and the primary telephony server, the status of the primary telephony server, and the health-check status on the server-link. When each of these conditions reports a fault free status the secondary telephony server can send a redirect-force command to a group of IP phones. Each phone can first go out of service with the secondary telephony server, and then go in-service with its primary telephony server, as illustrated in FIG. 8. The size of the group is selected so that network traffic on the telephony network is not overloaded. For instance, 250 IP phones at a time may be selected to failback.

Figure 16:
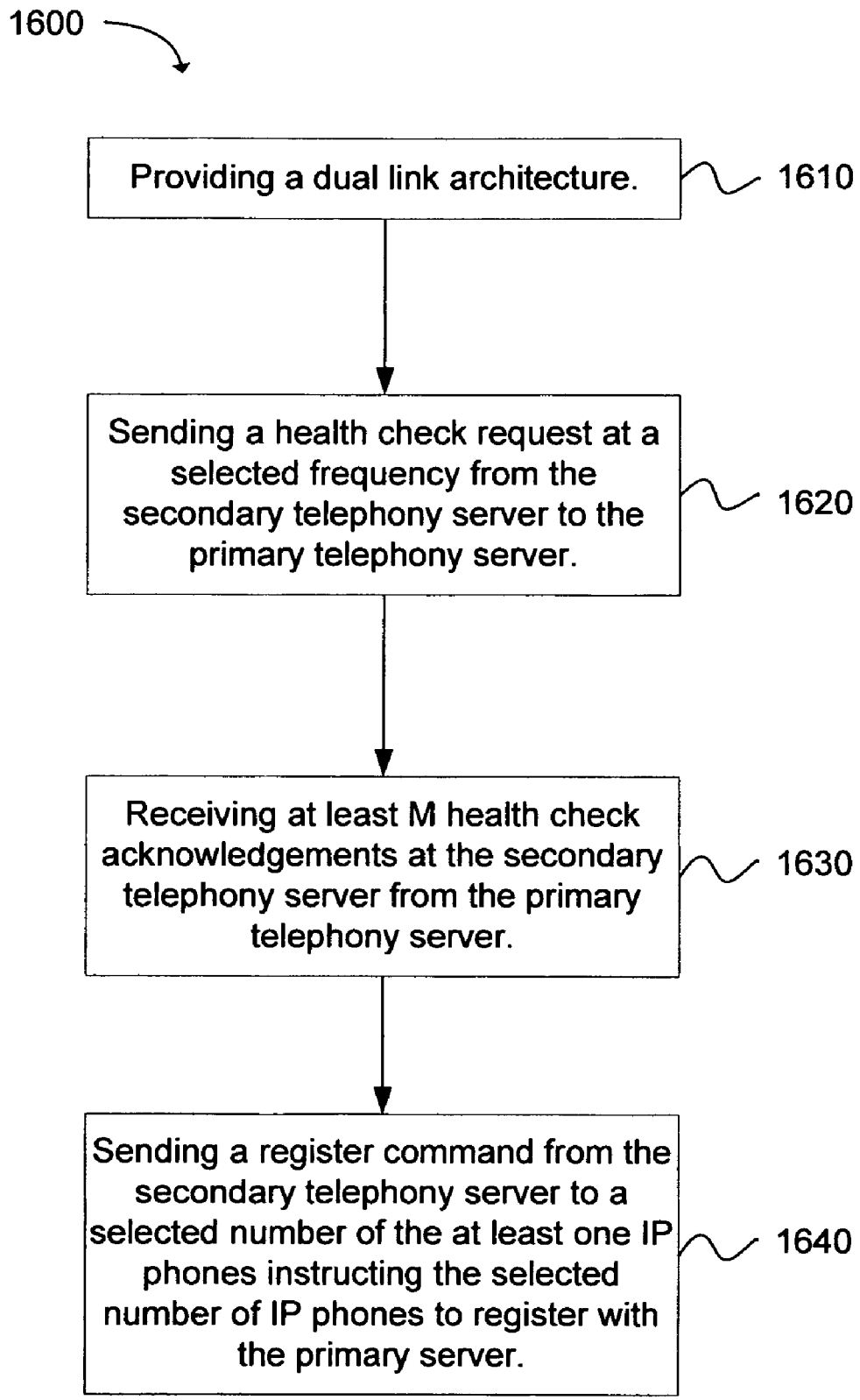
FIG. 16 depicts a flow chart depicting a method for determining a health status of a primary telephony server in accordance with an embodiment of the present invention.

In accordance with one embodiment of the present invention, a method 1600 for restoring IP phones after a server failure is disclosed, as depicted in the flow chart of FIG. 16. The method includes the operation of providing 1610 a dual link architecture comprising: a primary telephony server in communication with at least one IP phone through a primary client-link formed using a transmission control protocol; a secondary telephony server in communication with the at least one IP phone through a secondary client-link formed using a transmission control protocol; and a server-link formed using the transmission control protocol between the primary and secondary telephony servers. The primary and secondary telephony servers can be iPBX servers, as previously discussed.

The method 1600 further comprises sending 1620 a health check request at a selected frequency from the secondary telephony server to the primary telephony server. At least M health check acknowledgements can be received 1630 at the secondary telephony server from the primary telephony server. A register command can be sent 1640 from the secondary telephony server to a selected number of the at least one IP phones instructing the selected number of IP phones to register with the primary server to determine if the selected number of at least one IP phones are able to register.

The method 1600 can further comprise receiving a registration success message from the selected number of at least one IP phones; and sending the register command to a remaining number of the at least one IP phones. Once the IP phones have all been registered with the primary telephony server then the fail-back procedure can be performed in a relatively short time period, a previously discussed.

The method 1600 can further comprise receiving a registration fail message from at least one of the selected number of IP phones; waiting a selected period of time; and sending the register command from the secondary telephony server to the selected number of IP phones instructing the selected number of IP phones to register with the primary server. Once the IP phones have all been registered with the primary telephony server then the fail-back procedure can be performed in a relatively short time period, a previously discussed.

The HHB process provides a reliable failback process that will allow the IP phones to transition from the secondary telephony server to the primary telephony server with minimal interruption in service. Since the failback process is not used on IP phones that are in use, a user will typically not notice any loss of service as the failback process is accomplished. The pre-registration process can be accomplished while the IP phone is still in-service with the secondary telephony server and operating normally. After the pre-registration process has been completed then the failback process can typically be accomplished in a period of tens of milliseconds, though the actual time period can vary depending on the system architecture, network traffic, and so forth.

Integrated System Operations

The dual link architecture is an architecture that is designed to provide resilient operation for IP phones connected to a primary telephony server and a secondary telephony server in a distributed environment. Example system processes operating on this architecture are now described.

In one example embodiment that is described with reference to the example illustration of FIG. 5, a system is comprised of 1000 IP phones 506 that are configured to use the same primary telephony server (P-iPBX) 504 and secondary telephony server (S-iPBX) 510. All phones are considered to be online and in-service with the primary telephony server and pre-registered with the secondary telephony server. The IP phones are configured to exchange heartbeats with the P-IPBX every 30 seconds over the P-link 502. Heartbeats can be exchanged with the secondary telephony server at a periodic rate as well over the S-link 508. The periodic rate may be at a slower rate than is used with the P-iPBX. For instance, heartbeats with the S-iPBX may be exchanged once every 60 seconds to provide reachability tests at both ends of the p-link and s-link, respectively. The S-iPBX is configured to perform health-checks with the P-iPBX once every 2 seconds and receive the expected health-check-ACK reply at the same rate over the server-link 512. The P-iPBX can send several additional messages over the server-link connection, such as the None-failure, Link-Status-Notice, Node-Status-Notice, and Peer-List-Notice messages to the S-iPBX. The overall system can be operating in a normal state.

System Operations on Network Link Failures

In the example, some or all of the P-links 502 go down due to a network outage that occurs at an unpredictable time. The P-iPBX 504 will first discover the link failures. The P-iPBX will immediately send a "Link-Status-Notice" (LSN) message to the S-iPBX 510, as previously described. At this time, the IP phones have not yet detected two consecutive heartbeat misses yet. Therefore, the IP phones consider the system to be operating in normal condition. Since the system failures are on the client-links, the P-iPBX server node is operating normally. Thus, the S-iPBX is still receiving health-check acknowledgement messages from the P-iPBX over the server link 512.

Upon receiving the LSN message the S-iPBX 510 can check to determine the severity of the failure. For simplicity, it is assumed that the severity level S=critical. It can be inferred from this that all of the P-links 502 are not functional.

Accordingly, the S-iPBX 510 starts the failover process. The S-iPBX sends a redirect-force command through each S-link 508 to each of the one thousand IP phones 506. Each IP phone then sends an out-service-request message to the P-iPBX 504 over the P-link 502. Since the P-link is down, no response will be received from the P-iPBX. An in-service-request message is then sent from each IP phone to the S-iPBX over the S-link. An in-service-ACK message will then be received at each IP phone from the S-iPBX over the S-link. This allows all of the IP phones to quickly failover to the S-iPBX after the network failure has occurred.

After 60 seconds since the link failures happened, all IP phones 506 will experience missing two heartbeats from the P-iPBX 504. Each IP phone will then clear the device registration status, remove the security transport session, and delete the TCP connection with the P-iPBX.

After T_fb=10 minutes later, the S-iPBX 510 will send a register command to a selected number of the IP phones over the S-link 508, instructing the phones to begin the pre-registration process with the P-iPBX 504 over the P-link 502. This will fail if the P-link failures are not repaired or cleared. The S-iPBX will continue to periodically retry this operation every T_fb time.

Eventually, the S-iPBX will be successful in sending the register command and all of the 1,000 IP phones 506 will be pre-registered with the P-iPBX 504 when the p-link failure condition(s) have been cleared. Since the S-iPBX did not crash then all of the 1,000 IP phones are still registered with the S-iPBX. Once the IP phones have all registered with the P-iPBX then the P-iPBX will effectively be on hot-standby mode.

The S-iPBX 510 can then order all phones to failback to the P-iPBX 504 by sending a redirect-force command to each IP phone 506 over the S-link 508. Each phone will then send an out-service-request message over the S-link to the S-iPBX. Once an out-service-ACK message is received from the S-iPBX, each IP phone will send an in-service-Request message to the P-iPBX over the P-link 502 and receive an in-service-ACK message to complete the failover process. The completion of the failover process infers that the system has fully recovered and is again operating in its original normal status.

System Operations on Server Failures

When internal failures of the primary telephony server (P-iPBX) 504 occur, the primary telephony server can send one or more Node-Status-Notice messages to the secondary telephony server (S-iPBX) 510. In this example, it is assumed that the severity level S=critical. In this case, the S-iPBX can send a redirect-force command to order all phones to failover before the P-iPBX goes through a recovery or reboot process, as previously discussed.

Before the P-iPBX 504 has been rebooted then all P-links 502 are torn down and the S-iPBX 510 is unable to receive a health-check-ACK message from the P-iPBX. When the P-iPBX has rebooted and returned to service, the S-iPBX will discover this through the reception of health-check-ACK messages at a regular interval, such as once every two seconds.

The S-iPBX 510 can then use the HHB process to pre-register all of the phones with the P-iPBX 504. Finally, the S-iPBX can order all phones to failback to the P-iPBX when it is confirmed that the P-iPBX is operating normally based on the health-check-ACK messages and the pre-registration of the IP phones.

System Operation on Server-Link Failures

A failure of the server-link 1212 between the primary telephony server 1204 (P-iPBX) and the secondary telephony server 1210 (S-iPBX) can occur at an unpredictable time, as illustrated in FIG. 12. When this occurs, the S-iPBX can quickly detect M consecutive health-check-ACK misses. As previously discussed, at this point the S-iPBX does not know if the problem is due to a P-iPBX failure or a failure of the server-link failure.

Accordingly, the S-iPBX 1210 can proactively invite a selected number of IP phones 1206 to failover to the S-iPBX by sending a redirect-optional command over the S-link 1208 to the selected IP phones. The S-iPBX can execute the HHO process, which serves to further detect if it is necessary to force all of the IP phones to failover to the S-iPBX.

When the select number of IP phones do not failover to the S-iPBX, because they are able to successfully ping the P-iPBX 1204 over the P-link 1202, it can be inferred that the failure to receive messages is due to a problem with the server-link 1212. A warning can then be issued to a system administrator to repair the server-link. All of the IP phones 1206 can remain with the P-iPBX 1204.

There are additional use-cases which can share similar operational processes as described above. The systems and methods disclosed herein can be used to cover all scenarios under the fault model specified in the specification. For simplicity reasons, the additional scenarios will not be described in more detail.

In accordance with another embodiment of the present invention, a method 1400 for registering an internet protocol (IP) phone linked in a dual link architecture is disclosed, as depicted in the flow chart of FIG. 14. The method comprises the operation of pre-registering 1410 the IP phone to establish a client link with the first and second telephony servers.

The pre-registration process comprises identifying 1420 the first telephony server and the second telephony server designated for the IP phone in the dual link architecture. A registration request is sent 1430 to the first and second telephony servers from the IP phone. A registration acknowledgement is received 1440 from the first and second telephony servers.

Once the pre-registration process has been completed, one of the first and second telephony servers is set as a primary telephony server by sending 1450 an in-service request from the IP phone to one of the first and second telephony servers to identify the primary telephony server for the IP phone.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for detecting a client-link failure, comprising:
   providing a dual link architecture comprising:
      a primary telephony server in communication with at least one phone client through a primary client-link formed using a network transport session protocol;
      a secondary telephony server in communication with the at least one phone client through a secondary client-link formed using a network transport session protocol; and
      a server-link formed using a network transport session protocol between the primary and secondary telephony servers;
   detecting a primary client-link failure at the primary telephony server;
   sending a Link-Status-Notice (LSN) message from the primary telephony server to the secondary telephony server via the server link detailing at least one phone client associated with the client-link failure; and
   sending a type of redirect command from the secondary telephony server to the at least one phone client associated with the client-link failure via the secondary client-link, wherein the type of redirect command is based on a content of the LSN message.

2. The method of claim 1, further comprising sending an LSN message, where LSN=(S, C, DN-list), where S is a severity indicator, C is a total count of failed client-links, and DN-list is a list of directory numbers of the phone clients associated with the respective failed client-links.

3. The method of claim 2, where the severity indicator S is selected from the list consisting of none, minor, major, and critical.

4. The method of claim 2, wherein sending the type of redirect command further comprises sending a redirect-optional command to the at least one phone client associated with the respective failed client-links when the severity indicator is less than critical.

5. The method of claim 4, further comprising sending a ping from each of the at least one phone clients to the primary telephony server when the redirect-optional command is received from the secondary telephony server and performing a failover to the secondary telephony server if no response is received from the primary telephony server.

6. The method of claim 2, wherein sending the type of redirect command further comprises sending a redirect-force command to the at least one phone client associated with the respective failed client-links when the severity indicator is critical.

7. The method of claim, 6, further comprising immediately performing a failover to the secondary telephony server when the redirect-force command is received by the at least one phone client.

8. The method of claim 1, further comprising sending a node-status-notice from the primary server to the secondary server via the server-link, wherein the node-status-notice includes information regarding a health of the primary telephony server.

9. A method for detecting at least one of a primary server and a server-link failure, comprising:
   providing a dual link architecture comprising:
      a primary telephony server in communication with at least one phone client through a primary client-link formed using a network transport session protocol;
      at least one secondary telephony server, wherein one of the at least one telephony servers is in communication with the at least one phone client through a secondary client-link formed using a network transport session protocol; and
      a server-link formed using a network transport session protocol between the primary and secondary telephony servers;
   sending a health check request at a selected frequency from the secondary telephony server to the primary telephony server;
   expecting a health check acknowledgement at the secondary telephony server from the primary telephony server at the selected frequency; and
   determining whether the primary telephony server is functioning when a predetermined number of health check acknowledgements are not received at the secondary telephony server.

10. The method of claim 9, further comprising sending a redirect-force command to the at least one phone client when the predetermined number of health check acknowledgements are not received at the secondary telephony server to redirect the at least one phone client to the secondary telephony server.

11. The system of claim 9, wherein determining whether the primary telephony server is functioning further comprises:
   sending a Peer-List-Notice to a peer group comprising each secondary telephony server connected to the primary telephony server via a server-link at a system start up time to inform each secondary telephony server of peers operating as secondary servers;
   sending an updated Peer-List-Notice to members of the peer group from the primary telephony server if the peer group changes due to at least one of an added secondary telephony server, a removed secondary telephony server, a secondary telephony server that goes out-of-service, and a secondary telephony server that returns to service.

12. The method of claim 9, wherein determining whether the primary telephony server is functioning further comprises:
   sending a peer-link request to each peer secondary telephony server connected with the primary telephony server; and
   receiving a response from each peer secondary telephony server regarding whether each peer secondary telephony server can communicate with the primary server; and
   sending a redirect-force command to the at least one phone client when each peer secondary telephony server reports no communication with the primary server.

13. The method of claim 9, wherein determining whether the primary telephony server is functioning further comprises:
   sending a peer-link request to each peer secondary telephony server connected with the primary telephony server; and
   receiving a response from each peer secondary telephony server regarding whether each peer secondary telephony server can link to the primary server; and
   repairing the server-link between the primary and secondary telephony servers when at least one of the peer secondary servers reports communication with the primary server.

14. The method of claim 9, wherein determining whether the primary telephony server is functioning further comprises:
   sending a redirect-optional command from the secondary telephony server to a selected number of the at least one phone client;
   sending a ping from each of the selected phone clients to the primary telephony server;
   performing a failover for the selected phone clients if the primary telephony server does not respond to the ping;
   determining the primary telephony server is not functioning if the failover is performed for the selected phone clients within a selected time period; and
   sending a redirect-force command to a remaining number of the at least one phone clients.

15. The method of claim 9, wherein determining whether the primary telephony server is functioning further comprises:
   sending a redirect-optional command from the secondary telephony server to a selected number of the at least one phone client;
   sending a ping from each of the selected phone clients to the primary telephony server;
   performing a failover for the selected phone clients if the primary telephony server does not respond to the ping;
   determining the primary telephony server is functioning if the failover is not performed for the selected phone clients within a selected time period; and
   sending a request to repair the server-link between the primary and secondary telephony servers when at least one of the selected phone clients does not failover within the selected time period.

16. A method for restoring phone clients after a server failure, comprising:
   providing a dual link architecture comprising:
      a primary telephony server in communication with at least one phone client through a primary client-link formed using a network transportation session protocol;
      a secondary telephony server in communication with the at least one phone client through a secondary client-link formed using a network transportation session protocol; and
      a server-link formed using a network transport session protocol between the primary and secondary telephony servers;
   sending a health check request at a selected frequency from the secondary telephony server to the primary telephony server;

receiving at least M health check acknowledgements at the secondary telephony server from the primary telephony server; and sending a register command from the secondary telephony server to a selected number of the at least one phone clients instructing the selected number of phone clients to register with the primary server.

17. The method of claim 16, further comprising:

receiving a registration success message from the selected number of at least one phone clients; and sending the register command to a remaining number of the at least one phone clients.

18. The method of claim 17, further comprising performing a failback process on the at least one phone clients after registration with the primary telephony server has been completed.

19. The method of claim 16, further comprising:

receiving a registration fail message from at least one of the selected number of the at least one phone clients;

waiting a selected period of time; and sending the register command from the secondary telephony server to the selected number of the at least one phone clients instructing the selected number of phone clients to register with the primary server.

20. The method of claim 19, further comprising performing a failback process on the at least one phone clients after registration with the primary telephony server has been completed.

* * * * *